United States Patent
Tran et al.

(10) Patent No.: US 11,122,412 B2
(45) Date of Patent: Sep. 14, 2021

(54) DEVICE DISCOVERY

(71) Applicant: Intel Corporation, Santa Clara, CA (US)

(72) Inventors: Thuyen C Tran, Hillsboro, OR (US); Mats Gustav Agerstam, Portland, OR (US); Vijay Sarathi Kesavan, Portland, OR (US); Douglas K Hudson, Beaverton, OR (US); Shilpa A Sodani, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 40 days.

(21) Appl. No.: 16/608,734

(22) PCT Filed: May 9, 2017

(86) PCT No.: PCT/US2017/031737
§ 371 (c)(1),
(2) Date: Oct. 25, 2019

(87) PCT Pub. No.: WO2018/208287
PCT Pub. Date: Nov. 15, 2018

(65) Prior Publication Data
US 2021/0099854 A1    Apr. 1, 2021

(51) Int. Cl.
*H04W 84/18* (2009.01)
*H04W 8/00* (2009.01)
(Continued)

(52) U.S. Cl.
CPC .............. *H04W 8/005* (2013.01); *G16Y 10/75* (2020.01); *H04W 84/18* (2013.01); *H04W 88/16* (2013.01)

(58) Field of Classification Search
CPC ......... H04W 4/80; H04W 8/005; H04W 8/02; H04W 8/18; H04W 8/22; H04W 8/26;
(Continued)

(56) References Cited

U.S. PATENT DOCUMENTS

| 2011/0069665 A1* | 3/2011 | Erdmann | H04L 45/16 370/328 |
| 2012/0005337 A1* | 1/2012 | Sokabe | H04N 21/42225 709/224 |

(Continued)

FOREIGN PATENT DOCUMENTS

| WO | WO-2011053884 A1 | 5/2011 |
| WO | WO-2018208287 A1 | 11/2018 |

OTHER PUBLICATIONS

"International Application Serial No. PCT US2017 031737, International Preliminary Report on Patentability dated Nov. 21, 2019", 10 pgs.

(Continued)

*Primary Examiner* — Jean A Gelin
(74) *Attorney, Agent, or Firm* — Schwegman Lundberg & Woessner, P.A.

(57) ABSTRACT

System and techniques for device discovery described herein. A gateway device may initiate discovery in a self-organizing network attached to a first network interface of the gateway device. The gateway device may include a second network interface attached to a network that has a discovery protocol different than that of the self-organizing network. A reply from a node in the self-organizing network may be received in response to the discovery. A device class may be extracted from the reply. Here, the device class corresponds to the node and is selected from a set of device classes defined for the network. A mapping between the second network interface and the first network interface (Continued)

based on the device class may be registered. A response to a query from the network may be completed using the mapping.

24 Claims, 8 Drawing Sheets

(51) Int. Cl.
*G16Y 10/75* (2020.01)
*H04W 88/16* (2009.01)

(58) Field of Classification Search
CPC ..... H04W 8/30; H04W 12/009; H04W 12/69; H04W 84/18; H04W 84/22; H04W 76/11; H04W 76/14; H04W 88/04
See application file for complete search history.

(56) References Cited

U.S. PATENT DOCUMENTS

| | | | |
|---|---|---|---|
| 2013/0215942 A1* | 8/2013 | Addepalli | H04L 1/007 375/224 |
| 2013/0259016 A1 | 10/2013 | Xhafa et al. | |
| 2015/0124702 A1* | 5/2015 | Ozturk | H04W 24/00 370/328 |
| 2015/0180772 A1 | 6/2015 | Hui et al. | |
| 2015/0208320 A1* | 7/2015 | Alexander | H04W 48/12 370/254 |
| 2018/0063879 A1* | 3/2018 | Lee | H04W 76/14 |
| 2019/0044740 A1* | 2/2019 | Smith | H04L 9/0822 |
| 2019/0349426 A1* | 11/2019 | Smith | H04W 84/22 |
| 2019/0364492 A1* | 11/2019 | Azizi | H04W 52/0264 |

OTHER PUBLICATIONS

"International Application Serial No. PCT/US2017/031737, International Search Report dated Nov. 17, 2017", 5 pgs*.

"International Application Serial No. PCT/US2017/031737, Written Opinion dated Nov. 17, 2017", 10 pgs.

Karowski, Niels, et al., "Optimized Asynchronous Multichannel Discovery of IEEE 802.15.4-Based Wireless Personal Area Networks", IEEE Transactions on Mobile Computing IEEE Service Center Los Alamitos CA US, vol. 12 No. 10, (Oct. 1, 2013), 1972-1985.

* cited by examiner

DEVICE DISCOVERY

PRIORITY APPLICATION

This application is a U.S. National Stage Application under 35 U.S.C. 371 from International Application No. PCT/US2017/031737, filed May 9, 2017, published as WO 2018/208287, which is incorporated herein by reference in its entirety.

TECHNICAL FIELD

Embodiments described herein generally relate to computer networking and more specifically to device discovery.

BACKGROUND

The internet-of-things (IoT) refers to devices and communication networks to connect a multitude of devices, many of which were previously unconnected. Examples may include sensor arrays, control systems, appliances, building automation systems, among others. Industrial IoT (IIoT) refers to IoT deployments that may be more tailored to industrial settings, such as safety monitoring, hardened devices, etc. The Open Connectivity Foundation (OCF) is a standards body promulgating communications protocols to facilitate a variety of IoT deployments. The OCF family of standards defines application layer communication endpoints, object (e.g., data) definitions, discovery and security procedures to allow the exchange of data between IoT devices and services.

A variety of techniques may be used to provide the physical layer connectivity of IoT deployments. Although wired techniques, such as Ethernet, are possible, IoT deployments generally employ wireless technologies to ease deployment placements and costs. An example wireless technology used in some IoT deployments operates in accordance with an IEEE 802.15.4 family of standards. This technology allows for a variety of efficient (e.g., low power) self-organizing networks. IEEE 802.15.4e is a variation permitting high device deployment densities via time slot channel hopping (TSCH), which allows for dense sensor networks to support the next generation of connected systems.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Although the OCF family of standards provides well-defined and flexible interoperability between device from different vendors, and 802.15.4 provides an efficient and capable wireless networking solution for those devices, there is room to improve device deployments that use both technologies. One such area is in device or service discovery. Both OCF compliant devices and 802.15.4 devices endure communications overhead to maintain active nodes in their respective networks. Generally, the 802.15.4 layer spends processing and radio resources to self-organize into the physical network that the OCF clients then use to implement their own discovery and management traffic. This typical operating procedure entails a duplication in efforts at the cost of radio resources, processing resources, and power resources. What is needed is a way to combine the management and discovery processes of devices operating in accordance to an OCF network and an 802.15.4 network.

Figure 1:
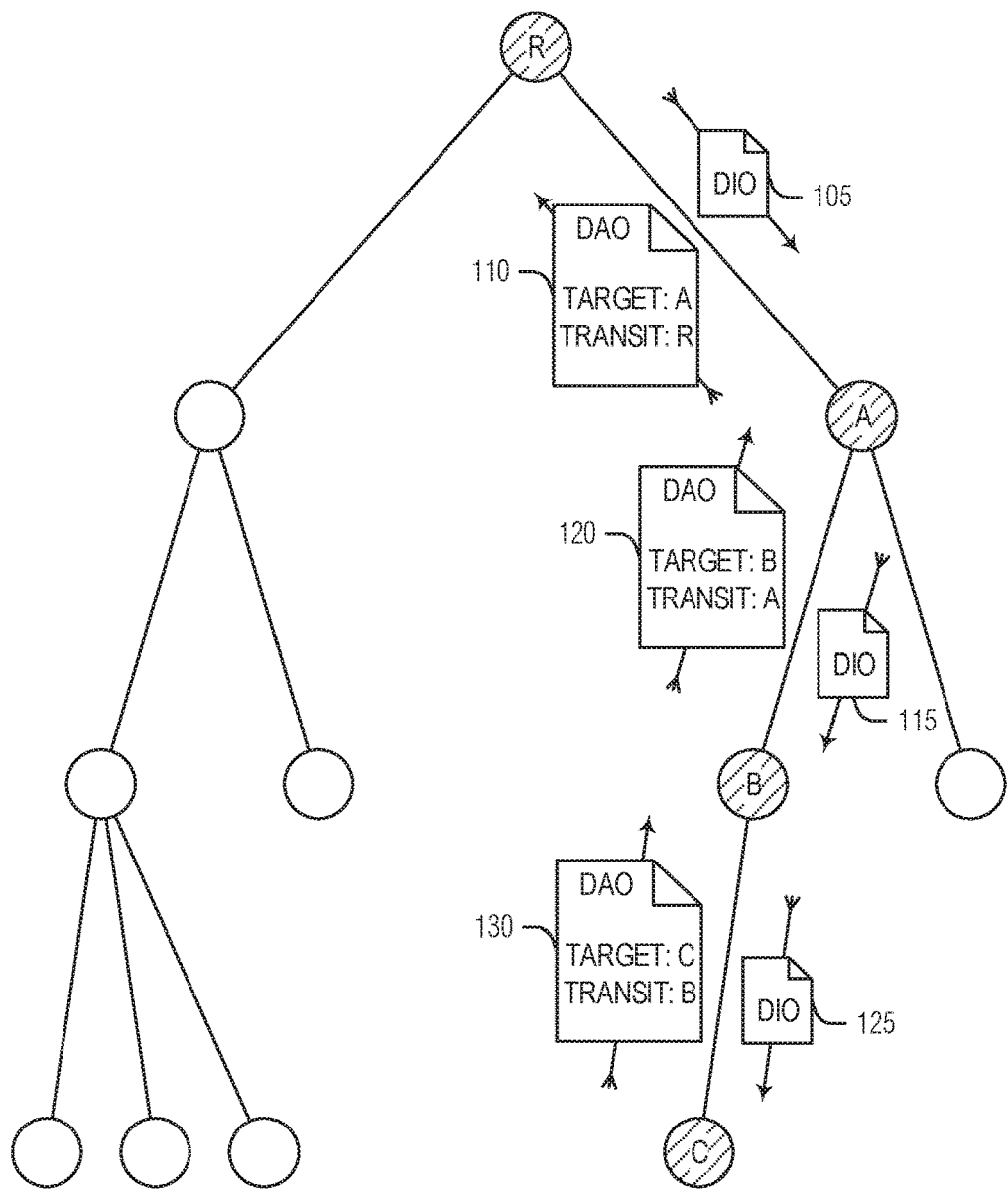
FIG. 1 illustrates an example of message passing to organize a self-organizing network, according to an embodiment.

FIG. 1 illustrates an example of message passing to organize a self-organizing network 100, according to an embodiment. In this example, the self-organizing network operates in accordance with the 802.15.4 family of standards. The network 100 uses IPv6 Routing Protocol for Low-Power and Lossy Networks (RPL) to discovery nodes and determine routing between those nodes. Due to the possibly changing nature of the network, such as when nodes are added, removed, etc., RPL messages are continuous to maintain network topology and routing at all times.

The basic communication structure present in RPL uses Destination-Oriented Directed Acyclic Graph (DODAG) Information Object (DIO) and Destination Advertisement Object (DAO) messages. When the network 100 is initialized, a root (e.g., coordinator) node transmits a DIO 105 that includes information about the root. The DIO 105 is received by node A, in this example, which then adds its information to the DIO 105 and transmits DIO 115 to node B. Node A also uses an objective function to rate reachable nodes and select a parent node. The choice of parent node is communicated towards the root using DAO 110. As illustrated, node A identifies itself in the DAO 110 as the target and identifies its parent, the root node, in the transit field. Node B similarly adds its information to the DIO 115 the combined information in DIO 125 to node C. Node B also identifies a parent and transmits DAO 120 back to the root node. Node C receives DIO 125, selects a parent node, and transmits DAO 130 back to the root node. Thus, the DIO messages permit downstream nodes to be informed of the upstream topology while the DAO messages allow upstream nodes to know the downstream topology. As noted above, this process operates continuously to maintain the network.

OCF onboarding and discovery generally operates at a higher network layer than RPL. Thus, after the network 100 is established, OCF processes run on top of the network to connect to each other. To improve upon the typical operating procedure of OCF running atop an 802.15.4 network 100, RPL may be extended to also support OCF discovery. Combining OCF discovery and RPL eliminates unnecessary OCF related discovery messages that would otherwise have to be performed over IPv6. Not only does this arrangement reduce network traffic with minimal overhead, but also significantly reduces discovery time.

In an example, RPL may be configured to support OCF discovery by extending DAO packets to advertise OCF resources, These OCF resources may then be discovered from RPL source routing construction. This arrangement has several benefits, including:
  a) Removing network overhead for OCF discovery. RPL traffic is continual and specified in the 802.15.4e family of standards; thus, RPL is a constant. Leveraging this existing traffic pattern for OCF discovery eliminates the need for explicit OCF discovery and advertisement messages, hence eliminating the network overhead.
  b) Removing OCF discovery latency. The discovery flow of OCF services is done at topology formation or reformation. RPL is the basis upon which topology changes (e.g., formation or reformation) occur. Thus, if RPL is used to perform OCF discovery, the OCF discovery will be completed as soon as the topology change is complete.
  c) Improving spectrum efficiency and reduce network power use. Because network overhead for OCF discovery is removed, less redundant traffic is present on the network 100. Thus, radio resources (e.g., spectrum) that would have otherwise carried OCF discovery traffic may be used for other purposes. Further, on power constrained devices, less traffic results in reduced power consumption.

The relationship between OCF and 802.15.4 devices may include an OCF stack on each node of the network 100. Here, the root (e.g., coordinator, gateway, etc.) acts as an OCF Resource Directory. Each node operates as an OCF Server, communicating directly to OCF clients, and offloads resource discovery to 802.15.4. In an example, the nodes do not have an OCF stack and thus do not communicate directly with OCT client. Instead, the root functions as an OCF Intermediary. These nodes to the root using 802.15.4 and the root communicates with the OCF clients. This scenario is discussed in more detail below.

Figure 2:
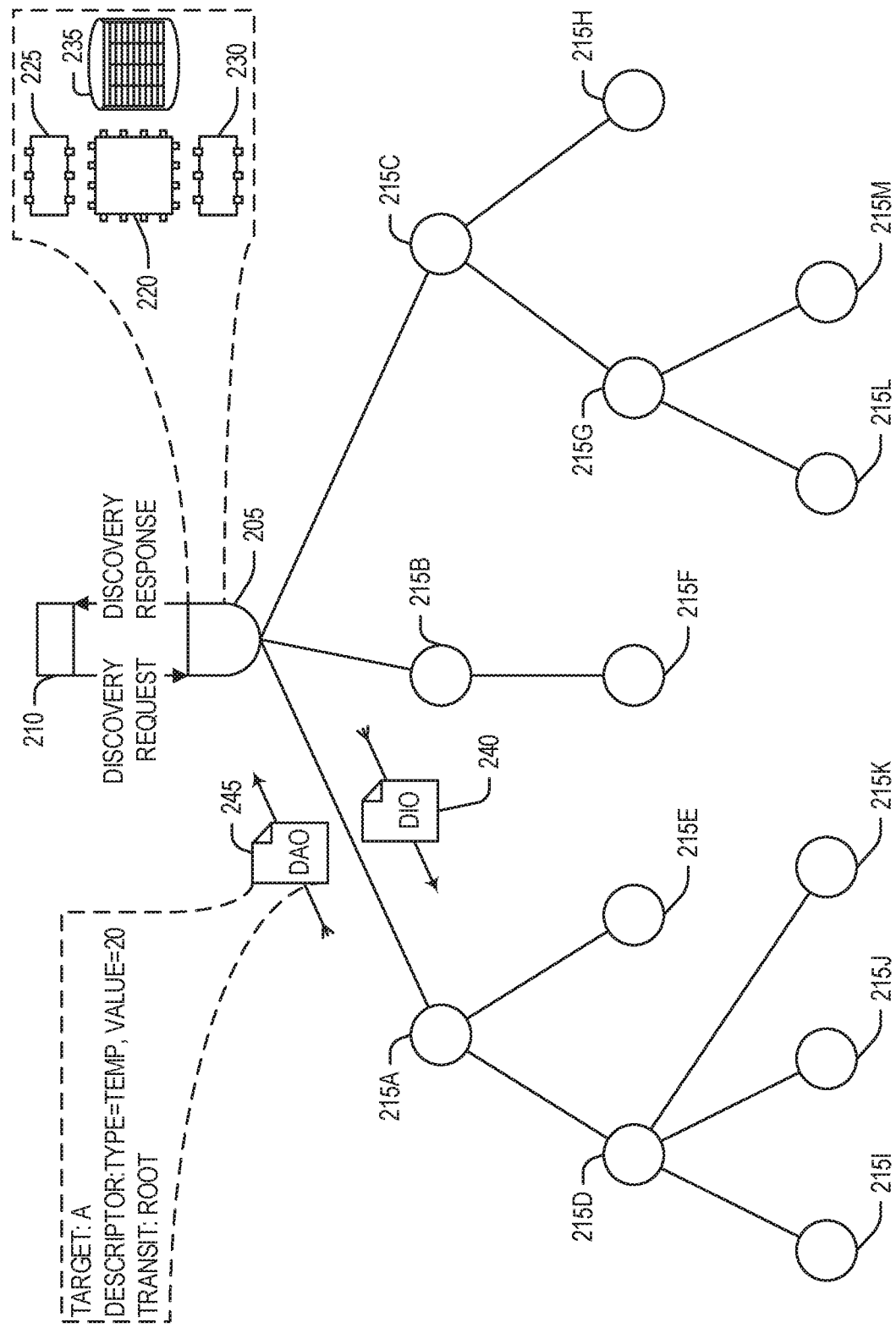
FIG. 2 illustrates a block diagram of an example of a system for device discovery, according to an embodiment.

FIG. 2 illustrates a block diagram of an example of a system 205 for device discovery, according to an embodiment. The system 205 includes processing circuitry 220, a first network interface 230, and a second network interface 225. These components are implemented in electronic hardware.

When in operation, the first network interface 230 connects to a self-organizing network and the second network interface 225 connects to a network with a different discovery protocol than the self-organizing network. As illustrated, nodes 215 are in the self-organizing network and OCF client 210 is in the network attached to the second network interface 225.

The processing circuitry 120 is arranged to initiate discovery in the self-organizing network. In an example, the self-organizing network operates in accordance to an IEEE 802.15.4e family of standards. In an example, the discovery operates in accordance to RPL. In an example, to initiate the discovery, the processing circuitry is arranged to transmit a DIO 240 (e.g., to node 215A).

The processing circuitry 120 is arranged to receive a reply from a node in the self-organizing network in response to the discovery. In an example, the reply is a DAO 245.

The processing circuitry 120 is arranged to extract a device class from the reply. The device class may be encoded, for example, as an index to a dataset, compresses, etc., or the device class may be explicit. In an example, to extract the device class from the reply, the processing circuitry 120 is arranged to extract an encoding of the device class from a Target Descriptor Option of the DAO 245. In an example, the Target Descriptor Option is thirty-two bits. In an example, the DAO 245 includes The Target Descriptor Option, a Target Option, and a Transit Option. This is the example illustrated in FIG. 2. The unused thirty-two bits are leveraged to support a data descriptor type, "TEMP", and a value "20."

In an example, the device class corresponds to the node (e.g., node 215A) and is selected from a set of device classes defined for the network. For example, when the network is OCF compliant, the device class is a valid OCF device. As used herein, device class may refer to a particular device (e.g., a thermometer), a class of devices (e.g., temperature sensor which may include thermometers, fire detectors, or refrigeration units), or a class of data (e.g., temperature).

In an example, the processing circuitry 120 is arranged to extract a value that corresponds to the device class from the reply. In an example, the device class is a sensor and wherein the value is a measurement from the sensor. Thus, not only is discovery performed, such as determining that node 215A provide temperature data, but data retrieval may also be implemented via RPL, further reducing network communication and power use.

The processing circuitry 120 is arranged to register a mapping 235 between the second network interface 225 and the first network interface 230 based on the device class. The mapping 235 provides a connection between OCF client requests for a node 215 and data in the DAO 245 already received by the system 205 in the self-organizing network discovery. This permits the processing circuitry 120 to be arranged to respond to a query from the network (e.g., OCF client 210) using the mapping. In an example, to respond to the query using the mapping, the processing circuitry 120 is arranged to retrieve a node identification present in the reply (e.g., "A" in the target field of the DAO 245) corresponding to the device class (e.g., "TEMP" when temperature is requested by the OCF client 210), interrogate the node 215 using the node identification (e.g., node 215A) because it corresponds to the identification "A", and specifying a result type. The result type permits discrimination of data if, for example, the node 215 offers multiple data sources. Thus, if node 215A also provided humidity data, the result type indicates "TEMP" in order to receive temperature data.

As a result of the interrogation, the processing circuitry 120 may receive a result that corresponds to the result type. The processing circuitry 120 may then respond with the result. This sort of dynamic querying permits flexible access to the self-organizing network by the OCF network via the system 205. However, caching device data permits the nodes 215 to transmit when they have data, and further reduce unnecessary traffic caused by polling, or other inquiries performed when data may not be ready at the nodes 125. Thus, in an example, the processing circuitry 120 is arranged to store the device class and the value from the DAO 245 to create a device-value cache. The device-value cache may be retrieved using the mapping 235 and the processing circuitry 120 may then respond to the query with the value. In an example, the processing circuitry executes a request at a Uniform Resource Identifier (URI) when the value meets an acceptance criterion. This implements the OCF Observe pattern. The URI and the acceptance criterion included in the query from the OCF client 210.

The discussion above may be rephrased, in an example, as follows. When the 802.15.4 nodes 215 are powered on, nodes 215 are associated with nearby nodes 215 to form physical links among themselves. RPL is used to build a logical routing topology over this existing physical infrastructure in which the Gateway/Coordinator/root node 205 is responsible for communicating its network capabilities to other nodes by sending out DIO 240 messages and waiting for other nodes 215 join. When non-root nodes 215 receive DIOs, they decide whether to join the network accordingly. When a non-root node 215 decides to join the network, it will transmit DAO 245 that includes Target Option and Transit Information Option(s) fields and send the DAO 245 to the coordinator node 205. The Target Option contains the address of the node (e.g., "A" for node 215A) and the Transit information Option(s) contain its parents (e.g., "Root" for node 215A) along the path back to the coordinator node 205.

The coordinator node 205 uses the received DAOs 245 to construct and maintain downward routes. By this technique, the coordinator node 205 is able to build a source routing table and knows which route to reach a specific node 215 in its network. The process of sending DIOs 240 and DAOs 245 is a scheduled, ongoing activity used to maintain the 802.15.4 topology.

To benefit OCF Resource Discovery, the DAO 245 is extended with a Target Descriptor Option that carries OCF Resource Information for OCF resource discovery purposes. The Target Description Option may contain a thirty-two-bit unsigned integer, as shown below:

```
0 + ------------------------------------------
1 +
2 +
3 +
4 + Type=0x09
5 +
6 +
7 +
8 + ------------------------------------------
9 +
0 +
1 +
2 + Length=4
3 +
4 +
5 +
6 +
7 +
8 + ------------------------------------------
9 +
0 +
1 +
2 +
3 +
4 +
5 +
6 + Descriptor
7 +
8 +
9 +
0 +
1 +
2 +
3 +
4 +
5 +
6 +
7 +
8 + ------------------------------------------
```

The OCF stack is free to organize the discovery data to fit within the flexible four-byte Target Descriptor Option. Thus, a high-level DAO message with Target Description Option issued from node K 215K may look like this:

Target: A; Descriptor:Type=Temp, Value=20; Transit: Root

Target: D; Descriptor:Type=Temp, Value=30; Transit: A

Target: K; Descriptor:Type=Humidity, Value=40; Transit: D

By tagging OCF Resource Information during downward route construction, several advantages are obtained. For example, multi-cast traffic used in the existing OCF networks is eliminated, which may improve battery life. The complexity of discovering resources in a mesh network is reduced. This avoids the complex logic OCF participants would otherwise implement to look for available resources that are multiple hops away (e.g. recursively traverse each hop to find nearby resources and gather the results found at each hop. Further, difficulties in constructing resource identifiers are removed because information from every resource is gathered and maintained at the coordinator 205. In short, while the coordinator node 205 receives a DAO 245 message from a sensor node 215, available OCF resources on that sensor node 215 are discovered. Thus, if the OCF Client 210 issues a resource discovery request, the OCF Intermediary 205 interprets the information collected from the DAOs 245 to create an OCF resource discovery response and reply to OCF Client 210. This arrangement maintains OCF Discovery Request semantics such as:

GET /oic/res

GET /oic/res?type=temperature

GET /oic/res?type=temperature&above=20+below=50

Further, OCF resources may be discovered at any time because the coordinator node 205 continues to maintain downward routes to all nodes 215 in the 802.15.4 network. To address stale data issues RPL may be configured to adjust network refresh interval, topology changes detection interval, etc., for various use cases. This allows network operators to balance between reducing traffic, reducing energy consumption, increasing the ease to discover and maintain the network, etc.

Figure 3:
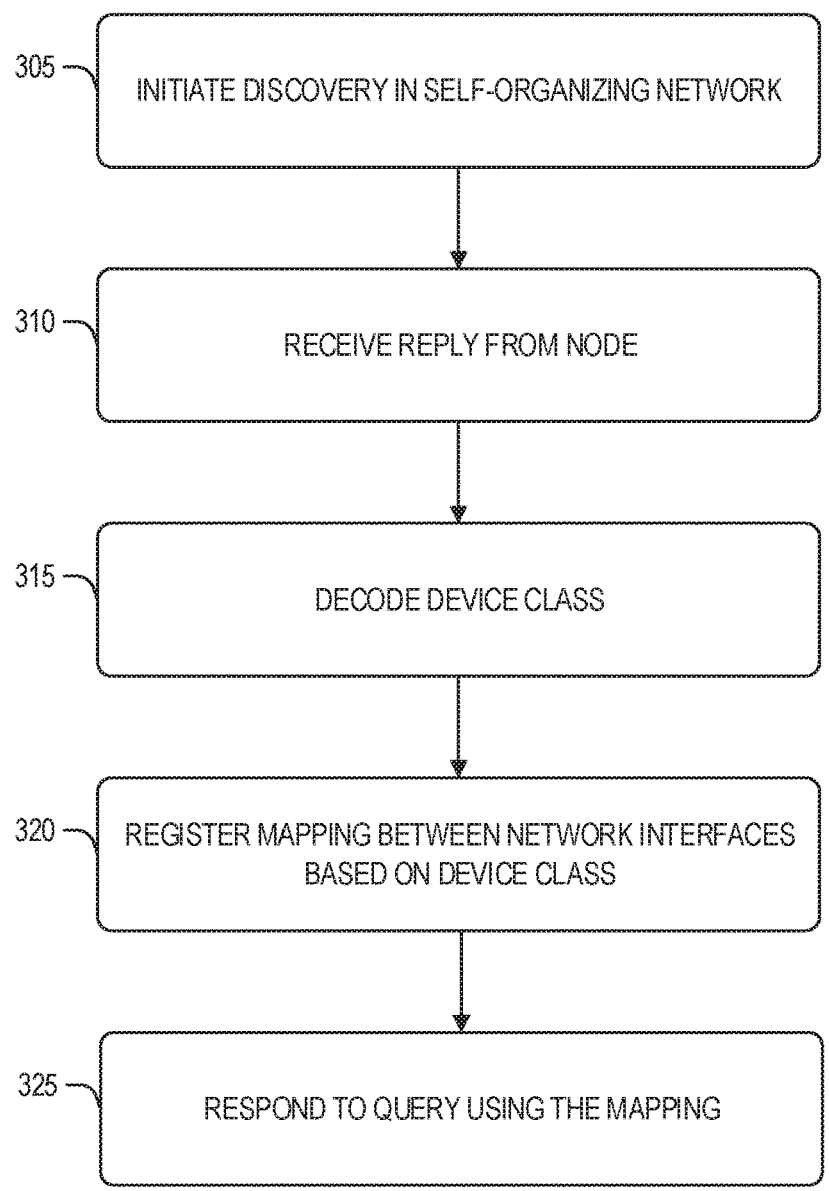
FIG. 3 illustrates an example of a method for device discovery, according to an embodiment.

FIG. 3 illustrates an example of a method 300 for device discovery, according to an embodiment. The operations of the method 300 are performed on electronic hardware, such as that described above or below.

At operation 305, a gateway device may initiate discovery in a self-organizing network attached to a first network interface of the gateway device. In an example, the gateway device includes a second network interface attached to a network that has a discovery protocol different than that of the self-organizing network. In an example, the self-organizing network operates in accordance to an IEEE 802.15.4e family of standards. In an example, the discovery operates in accordance to RPL. In an example, DIO.

At operation 310, a reply from a node in the self-organizing network is received in response to the discovery. In an example, the reply is a DAO.

At operation 315, a device class is extracted from the reply. In an example, the device class corresponds to the node and is selected from a set of device classes defined for the network. In an example, extracting the device class includes extracting a value from the reply, where the value corresponds to the extracted device class. In an example, the device class is a sensor and wherein the value is a measurement from the sensor.

In an example, extracting the device class from the reply includes extracting an encoding of the device class from a Target Descriptor Option of a DAO. In an example, the Target Descriptor Option is thirty-two bits. In an example, the DAO includes The Target Descriptor Option, a Target Option, and a Transit Option.

At operation 320, a mapping between the second network interface and the first network interface is registered based on the device class.

At operation 325, a query from the network is answered using the mapping. In an example, responding to the query from the network using the mapping includes retrieving a node identification corresponding to the device class—the node identification present in the reply, interrogating the node in the self-organizing network using the node identification—the interrogating specifying a result type, receiving a result—in response to the interrogating—corresponding to the result type from the node, and responding to the query with the result.

In an example, responding to the query from the network using the mapping includes storing the device class and the value to create a device-value cache, retrieving the device-value cache using the mapping, and responding to the query with the value. In an example, responding to the query with the value includes executing a request at a Uniform Resource Identifier (URI) when the value meets an acceptance criterion, the URI and the acceptance criterion included in the query.

Figure 4:
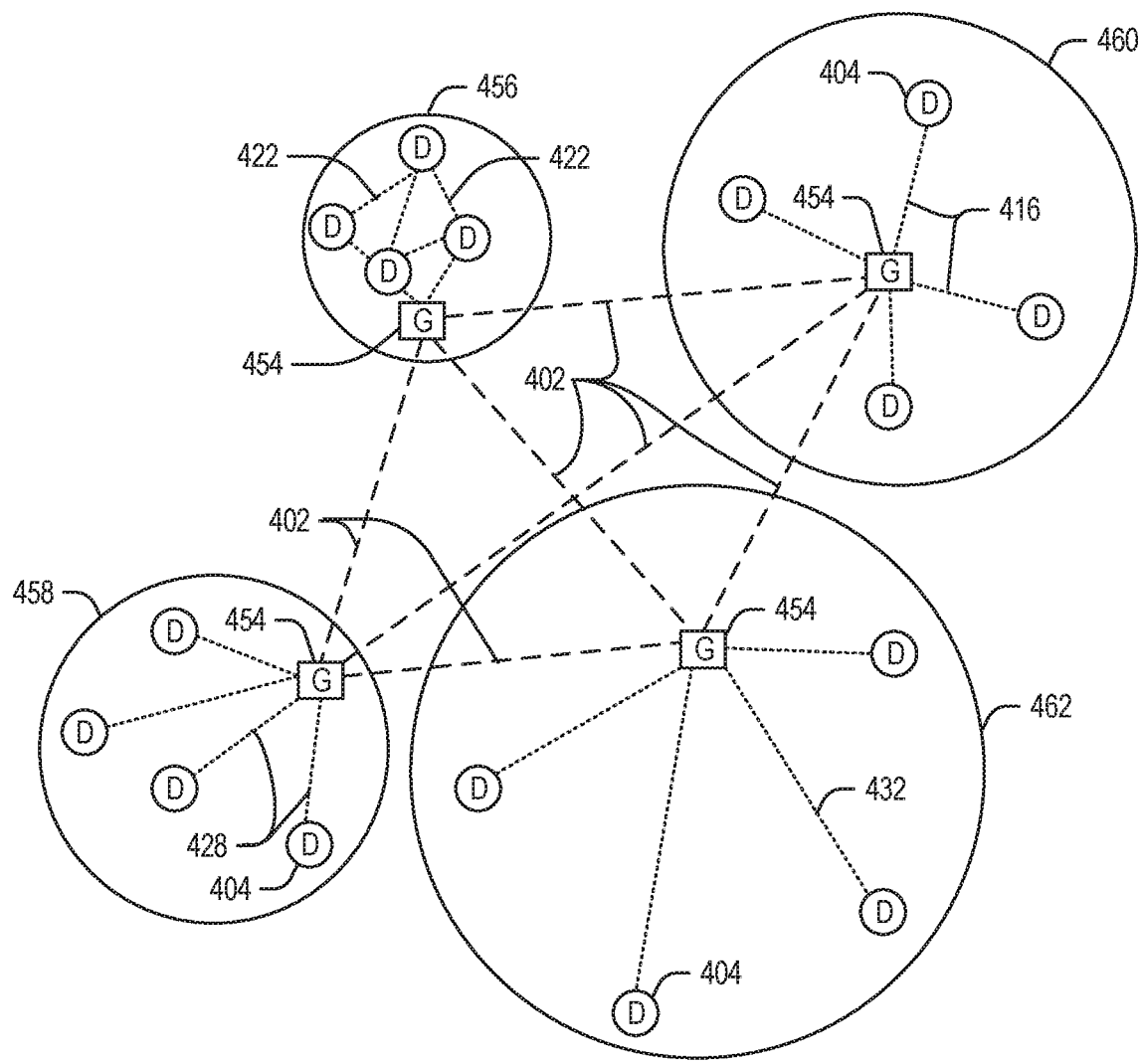
FIG. 4 illustrates a domain topology for respective internet-of-things (IoT) networks coupled through links to respective gateways, according to an embodiment.

FIG. 4 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks present a number of new challenges in a heterogeneous network of connectivity comprising a combination of wired and wireless technologies.

FIG. 4 specifically provides a simplified drawing of a domain topology that may be used for a number of internet-of-things (IoT) networks comprising IoT devices 404, with the IoT networks 456, 458, 460, 462, coupled through backbone links 402 to respective gateways 454. For example, a number of IoT devices 404 may communicate with a gateway 454, and with each other through the gateway 454. To simplify the drawing, not every IoT device 404, or communications link (e.g., link 416, 422, 428, or 432) is labeled. The backbone links 402 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The network topology may include any number of types of IoT networks, such as a mesh network provided with the network 456 using Bluetooth low energy (BLE) links 422. Other types of IoT networks that may be present include a wireless local area network (WLAN) network 458 used to communicate with IoT devices 404 through IEEE 802.11 (Wi-Fi®) links 428, a cellular network 460 used to communicate with IoT devices 404 through an LTE/LTE-A (4G) or 4G cellular network, and a low-power wide area (LPWA) network 462, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and Internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 404, such as over the backbone links 402, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements and traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 456, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 458, for instance, may use systems that perform standards conversion to provide multi-standard connectivity, enabling IoT devices 404 using different protocols to communicate. Further systems may provide seamless interconnectivity across a multi-standard infrastructure comprising visible Internet resources and hidden Internet resources.

Communications in the cellular network 460, for instance, may be enhanced by systems that offload data, extend communications to more remote devices, or both. The LPWA network 462 may include systems that perform non-Internet protocol (IP) to IP interconnections, addressing, and routing. Further, each of the IoT devices 404 may include the appropriate transceiver for wide area communications with that device. Further, each IoT device 404 may include other transceivers for communications using additional protocols and frequencies.

Finally, clusters of IoT devices may be equipped to communicate with other IoT devices as well as with a cloud network. This may allow the IoT devices to form an ad-hoc network between the devices, allowing them to function as a single device, which may be termed a fog device.

Figure 5:
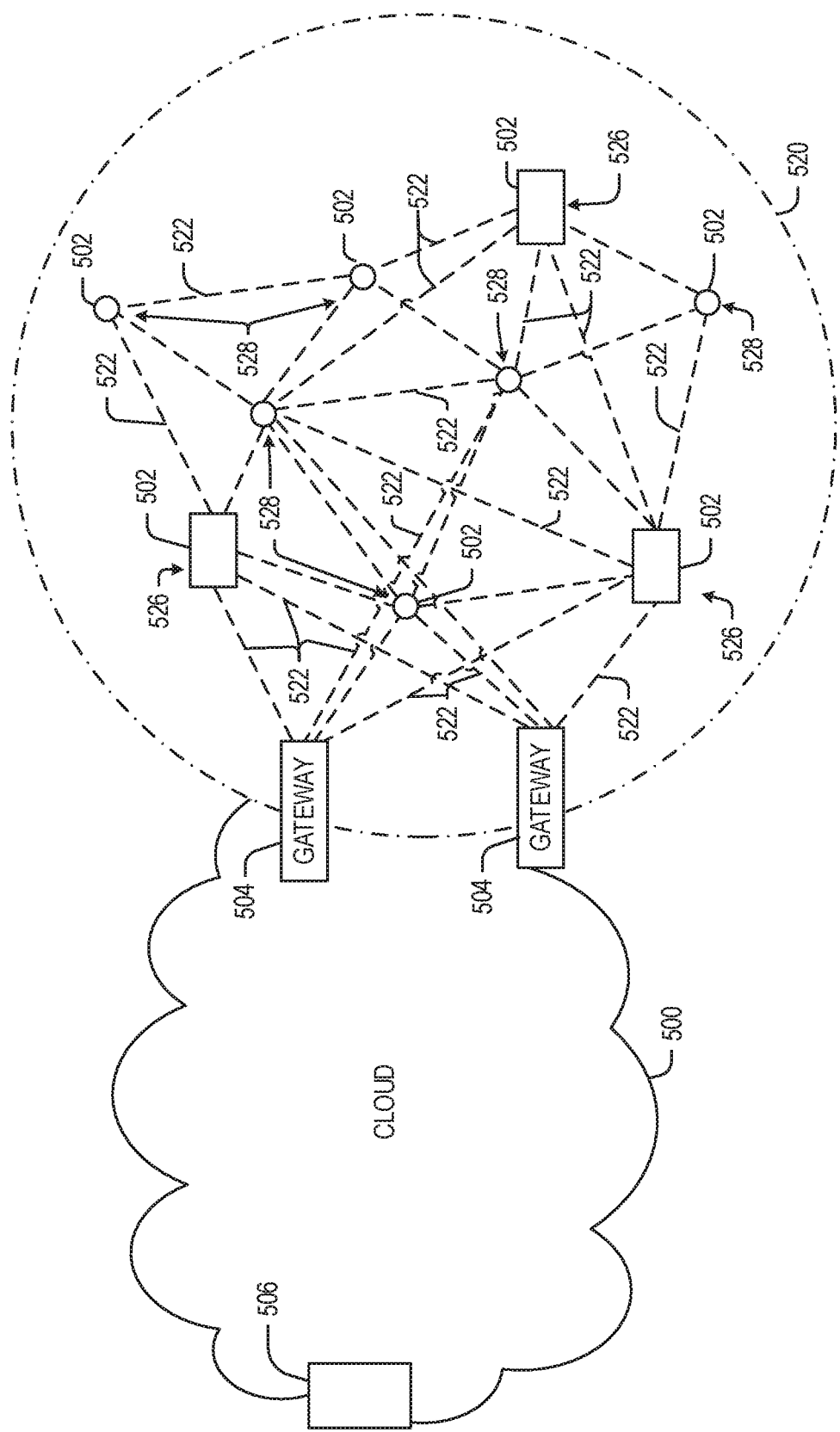
FIG. 5 illustrates a cloud computing network in communication with a mesh network of IoT devices operating as a fog device at the edge of the cloud computing network, according to an embodiment.

FIG. 5 illustrates a cloud computing network in communication with a mesh network of IoT devices (devices 502) operating as a fog device at the edge of the cloud computing network. The mesh network of IoT devices may be termed a fog 520, operating at the edge of the cloud 500. To simplify the diagram, not every IoT device 502 is labeled.

The fog 520 may be considered to be a massively interconnected network wherein a number of IoT devices 502 are in communications with each other, for example, by radio links 522. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 502 are shown in this example, gateways 504, data aggregators 526, and sensors 528, although any combinations of IoT devices 502 and functionality may be used. The gateways 504 may be edge devices that provide communications between the cloud 500 and the fog 520, and may also provide the backend process function for data obtained from sensors 528, such as motion data, flow data, temperature data, and the like. The data aggregators 526 may collect data from any number of the sensors 528, and perform the back end processing function for the analysis. The results, raw data, or both may be passed along to the cloud 500 through the gateways 504. The sensors 528 may be full IoT devices 502, for example, capable of both collecting data and processing the data. In some cases, the sensors 528 may be more limited in functionality, for example, collecting the data and allowing the data aggregators 526 or gateways 504 to process the data.

Communications from any IoT device 502 may be passed along the most convenient path between any of the IoT devices 502 to reach the gateways 504. In these networks, the number of interconnections provide substantial redundancy, allowing communications to be maintained, even with the loss of a number of IoT devices 502. Further, the use of a mesh network may allow IoT devices 502 that are very low power or located at a distance from infrastructure to be used, as the range to connect to another IoT device 502 may be much less than the range to connect to the gateways 504.

The fog 520 provided from these IoT devices 502 may be presented to devices in the cloud 500, such as a server 506, as a single device located at the edge of the cloud 500, e.g., a fog device. In this example, the alerts coming from the fog device may be sent without being identified as coming from a specific IoT device 502 within the fog 520. In this fashion, the fog 520 may be considered a distributed platform that provides computing and storage resources to perform processing or data-intensive tasks such as data analytics, data aggregation, and machine-learning, among others.

In some examples, the IoT devices 502 may be configured using an imperative programming style, e.g., with each IoT device 502 having a specific function and communication partners. However, the IoT devices 502 forming the fog device may be configured in a declarative programming style, allowing the IoT devices 5502 to reconfigure their operations and communications, such as to determine needed resources in response to conditions, queries, and device failures. As an example, a query from a user located at a server 506 about the operations of a subset of equipment monitored by the IoT devices 502 may result in the fog 520 device selecting the IoT devices 502, such as particular sensors 528, needed to answer the query. The data from these sensors 528 may then be aggregated and analyzed by any combination of the sensors 528, data aggregators 526, or gateways 504, before being sent on by the fog 520 device to the server 506 to answer the query. In this example, IoT devices 502 in the fog 520 may select the sensors 528 used based on the query, such as adding data from flow sensors or temperature sensors. Further, if some of the IoT devices 502 are not operational, other IoT devices 502 in the fog 520 device may provide analogous data, if available.

Figure 6:
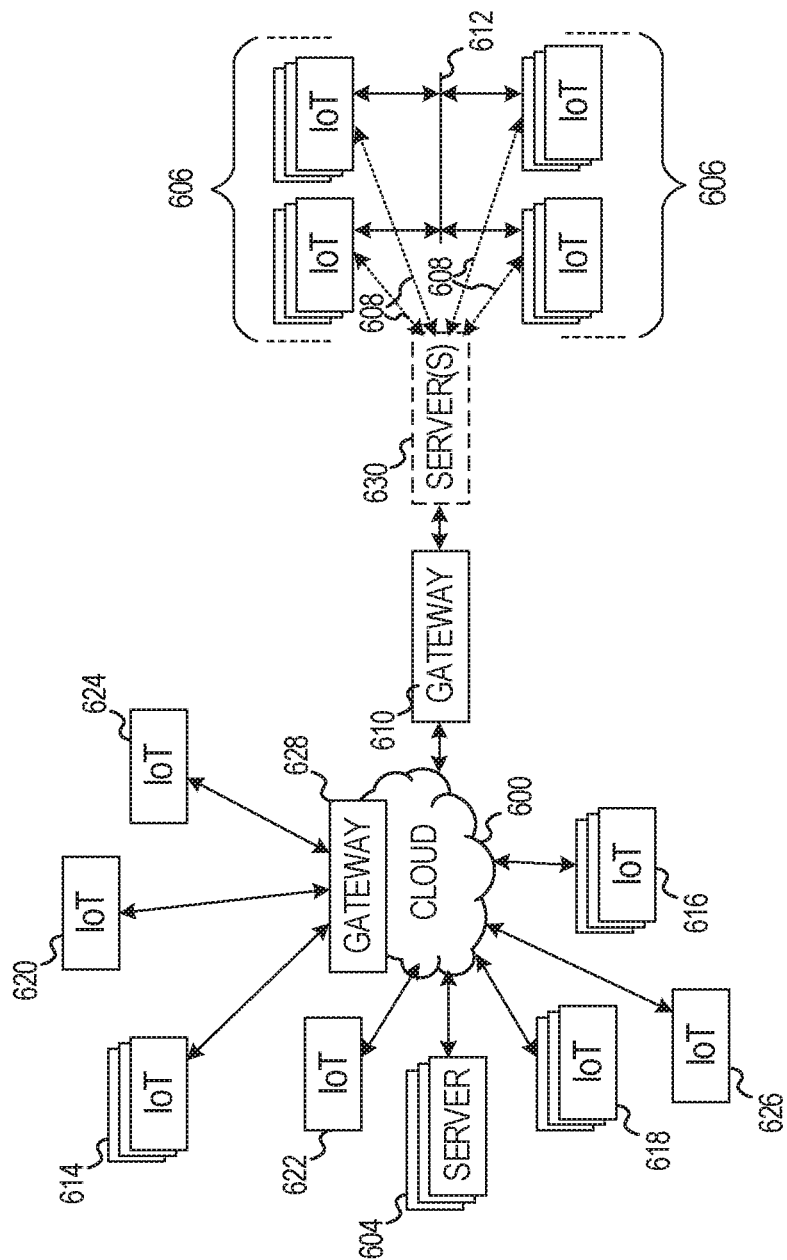
FIG. 6 illustrates a block diagram communications among a number of IoT devices, according to an embodiment.

FIG. 6 illustrates a drawing of a cloud computing network, or cloud 600, in communication with a number of Internet of Things (IoT) devices. The cloud 600 may represent the Internet, or may be a local area network (LAN), or a wide area network (WAN), such as a proprietary network for a company. The IoT devices may include any number of different types of devices, grouped in various combinations. For example, a traffic control group 606 may include IoT devices along streets in a city. These IoT devices may include stoplights, traffic flow monitors, cameras, weather sensors, and the like. The traffic control group 606, or other subgroups, may be in communication with the cloud 600 through wired or wireless links 608, such as LPWA links, optical links, and the like. Further, a wired or wireless sub-network 612 may allow the IoT devices to communicate with each other, such as through a local area network, a wireless local area network, and the like. The IoT devices may use another device, such as a gateway 610 or 628 to communicate with remote locations such as the cloud 600; the IoT devices may also use one or more servers 630 to facilitate communication with the cloud 600 or with the gateway 610. For example, the one or more servers 630 may operate as an intermediate network node to support a local edge cloud or fog implementation among a local area network. Further, the gateway 628 that is depicted may operate in a cloud-to-gateway-to-many edge devices configuration, such as in an assignment of the various IoT devices 614, 620, 624 being constrained or dynamic to an assignment and use of resources in the cloud 600.

Other example groups of IoT devices may include remote weather stations 614, local information terminals 616, alarm systems 618, automated teller machines 620, alarm panels 622, or moving vehicles, such as emergency vehicles 624 or other vehicles 626, among many others. Each of these IoT devices may be in communication with other IoT devices, with servers 604, with another IoT fog device or system, or a combination therein. The groups of IoT devices may be deployed in various residential, commercial, industrial, settings (including both private or public settings).

As may be seen from FIG. 6, a large number of IoT devices may be communicating through the cloud 600. This may allow different IoT devices to request or provide information to other devices autonomously. For example, a group of IoT devices (e.g., the traffic control group 606) may request a current weather forecast from a group of remote weather stations 614, which may provide the forecast without human intervention. Further, an emergency vehicle 624 may be alerted by an automated teller machine 620 that a burglary is in progress. As the emergency vehicle 624 proceeds towards the automated teller machine 620, it may access the traffic control group 606 to request clearance to the location, for example, by lights turning red to block cross traffic at an intersection in sufficient time for the emergency vehicle 624 to have unimpeded access to the intersection.

Clusters of IoT devices, such as the remote weather stations 614 or the traffic control group 606, may be equipped to communicate with other IoT devices as well as with the cloud 600. This may allow the IoT devices to form an ad-hoc network between the devices, allowing them to function as a single device, which may be termed a fog device or system.

Figure 7:
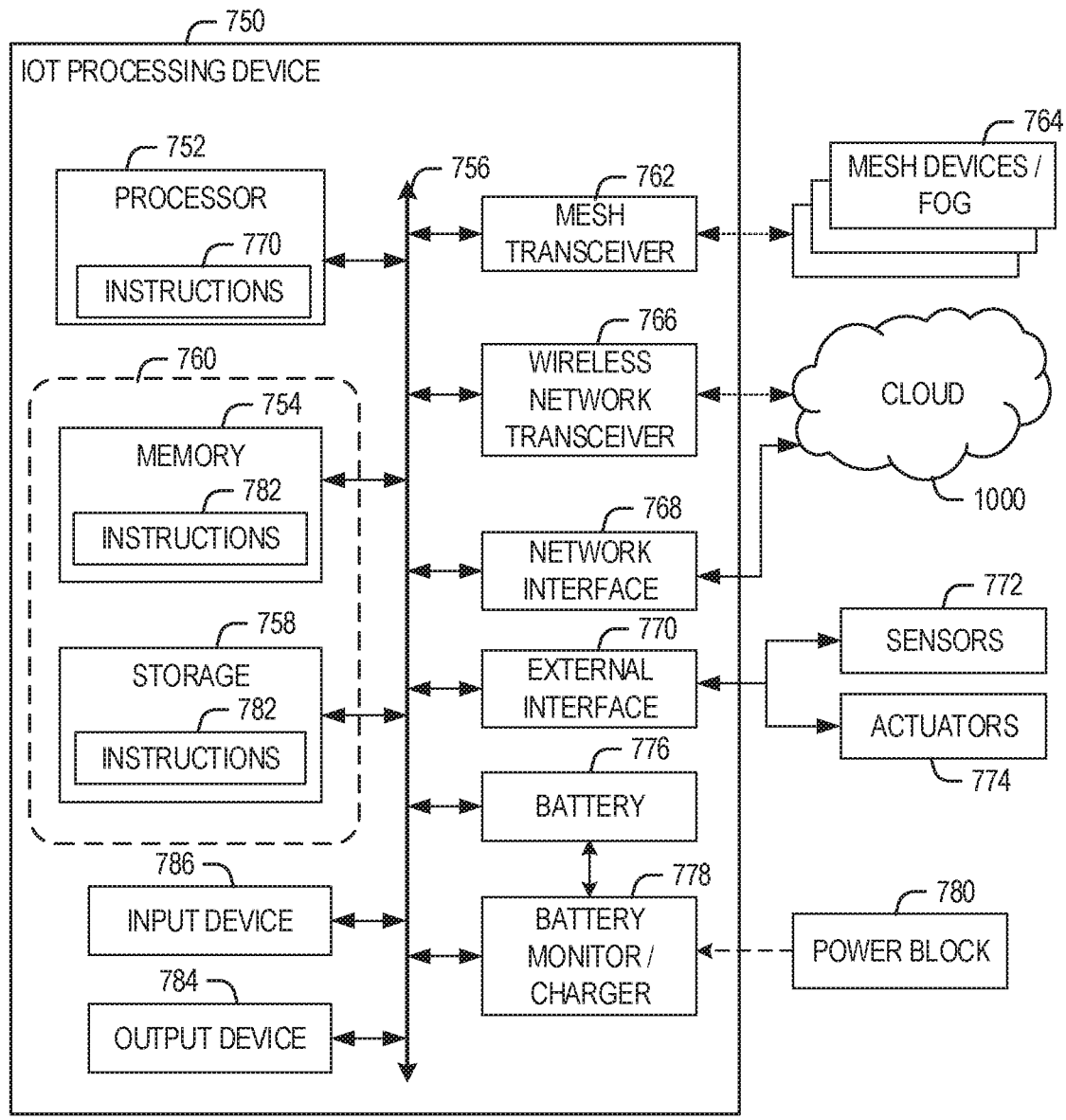
FIG. 7 illustrates a block diagram for an example IoT processing system architecture upon which any one or more of the techniques (e.g., operations, processes, methods, and methodologies) discussed herein may be performed, according to an embodiment.

FIG. 7 is a block diagram of an example of components that may be present in an IoT device 750 for implementing the techniques described herein. The IoT device 750 may include any combinations of the components shown in the example or referenced in the disclosure above. The components may be implemented as ICs, portions thereof, discrete electronic devices, or other modules, logic, hardware, software, firmware, or a combination thereof adapted in the IoT device 750, or as components otherwise incorporated within a chassis of a larger system. Additionally, the block diagram of FIG. 7 is intended to depict a high-level view of components of the IoT device 750. However, some of the components shown may be omitted, additional components may be present, and different arrangement of the components shown may occur in other implementations.

The IoT device 750 may include a processor 752, which may be a microprocessor, a multi-core processor, a multi-threaded processor, an ultra-low voltage processor, an embedded processor, or other known processing element. The processor 752 may be a part of a system on a chip (SoC) in which the processor 752 and other components are formed into a single integrated circuit, or a single package, such as the Edison™ or Galileo™ SoC boards from Intel. As an example, the processor 752 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 752 may communicate with a system memory 754 over an interconnect 756 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 758 may also couple to the processor 752 via the interconnect 756. In an example the storage 758 may be implemented via a solid state disk drive (SSDD). Other devices that may be used for the storage 758 include flash memory cards, such as SD cards, microSD cards, xD picture cards, and the like, and USB flash drives. In low power implementations, the storage 758 may be on-die memory or registers associated with the processor 752. However, in some examples, the storage 758 may be implemented using a micro hard disk drive (HDD). Further, any number of new technologies may be used for the storage 758 in addition to, or instead of, the technologies described, such resistance change memories, phase change memories, holographic memories, or chemical memories, among others.

The components may communicate over the interconnect 756. The interconnect 756 may include any number of technologies, including industry standard architecture (ISA), extended ISA (EISA), peripheral component interconnect (PCI), peripheral component interconnect extended (PCIx), PCI express (PCIe), or any number of other technologies. The interconnect 756 may be a proprietary bus, for example, used in a SoC based system. Other bus systems may be included, such as an I2C interface, an SPI interface, point to point interfaces, and a power bus, among others.

The interconnect 756 may couple the processor 752 to a mesh transceiver 762, for communications with other mesh devices 764. The mesh transceiver 762 may use any number of frequencies and protocols, such as 2.4 Gigahertz (GHz) transmissions under the IEEE 702.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 764. For example, a WLAN unit may be used to implement Wi-Fi™ communications in accordance with the Institute of Electrical and Electronics Engineers (IEEE) 702.11 standard. In addition, wireless wide area communications, e.g., according to a cellular or other wireless wide area protocol, may occur via a WWAN unit.

The mesh transceiver 762 may communicate using multiple standards or radios for communications at different range. For example, the IoT device 750 may communicate with close devices, e.g., within about 7 meters, using a local transceiver based on BLE, or another low power radio, to save power. More distant mesh devices 764, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 766 may be included to communicate with devices or services in the cloud 700 via local or wide area network protocols. The wireless network transceiver 766 may be a LPWA transceiver that follows the IEEE 702.15.4, or IEEE 702.15.4g standards, among others. The IoT device 750 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 702.15.4e specification may be used.

Any number of other radio communications and protocols may be used in addition to the systems mentioned for the mesh transceiver 762 and wireless network transceiver 766, as described herein. For example, the radio transceivers 762 and 766 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 762 and 766 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 766, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 768 may be included to provide a wired communication to the cloud 700 or to other devices, such as the mesh devices 764. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 768 may be included to allow connect to a second network, for example, a NIC 768 providing communications to the cloud over Ethernet, and a second NIC 768 providing communications to other devices over another type of network.

The interconnect 756 may couple the processor 752 to an external interface 770 that is used to connect external devices or subsystems. The external devices may include sensors 772, such as accelerometers, level sensors, flow sensors, optical light sensors, camera sensors, temperature sensors, a global positioning system (GPS) sensors, pressure sensors, barometric pressure sensors, and the like. The external interface 770 further may be used to connect the IoT device 750 to actuators 774, such as power switches, valve actuators, an audible sound generator, a visual warning device, and the like.

In some optional examples, various input/output (I/O) devices may be present within, or connected to, the IoT device 750. For example, a display or other output device 784 may be included to show information, such as sensor readings or actuator position. An input device 786, such as a touch screen or keypad may be included to accept input. An output device 784 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 750.

A battery 776 may power the IoT device 750, although in examples in which the IoT device 750 is mounted in a fixed location, it may have a power supply coupled to an electrical grid. The battery 776 may be a lithium ion battery, or a metal-air battery, such as a zinc-air battery, an aluminum-air battery, a lithium-air battery, and the like.

A battery monitor/charger 778 may be included in the IoT device 750 to track the state of charge (SoCh) of the battery 776. The battery monitor/charger 778 may be used to monitor other parameters of the battery 776 to provide failure predictions, such as the state of health (SoH) and the state of function (SoF) of the battery 776. The battery monitor/charger 778 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 778 may communicate the information on the battery 776 to the processor 752 over the interconnect 756. The battery monitor/charger 778 may also include an analog-to-digital (ADC) convertor that allows the processor 752 to directly monitor the voltage of the battery 776 or the current flow from the battery 776. The battery parameters may be used to determine actions that the IoT device 750 may perform, such as transmission frequency, mesh network operation, sensing frequency, and the like.

A power block 780, or other power supply coupled to a grid, may be coupled with the battery monitor/charger 778 to charge the battery 776. In some examples, the power block 780 may be replaced with a wireless power receiver to obtain the power wirelessly, for example, through a loop antenna in the IoT device 750. A wireless battery charging circuit, such as an LTC4020 chip from Linear Technologies of Milpitas, Calif., among others, may be included in the battery monitor/charger 778. The specific charging circuits chosen depend on the size of the battery 776, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 758 may include instructions 782 in the form of software, firmware, or hardware commands to implement the techniques described herein. Although such instructions 782 are shown as code blocks included in the memory 754 and the storage 758, it may be understood that any of the code blocks may be replaced with hardwired circuits, for example, built into an application specific integrated circuit (ASIC).

In an example, the instructions 782 provided via the memory 754, the storage 758, or the processor 752 may be embodied as a non-transitory, machine readable medium 760 including code to direct the processor 752 to perform electronic operations in the IoT device 750. The processor 752 may access the non-transitory, machine readable medium 760 over the interconnect 756. For instance, the non-transitory, machine readable medium 760 may be embodied by devices described for the storage 758 of FIG. 7 or may include specific storage units such as optical disks, flash drives, or any number of other hardware devices. The non-transitory, machine readable medium 760 may include instructions to direct the processor 752 to perform a specific sequence or flow of actions.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Figure 8:
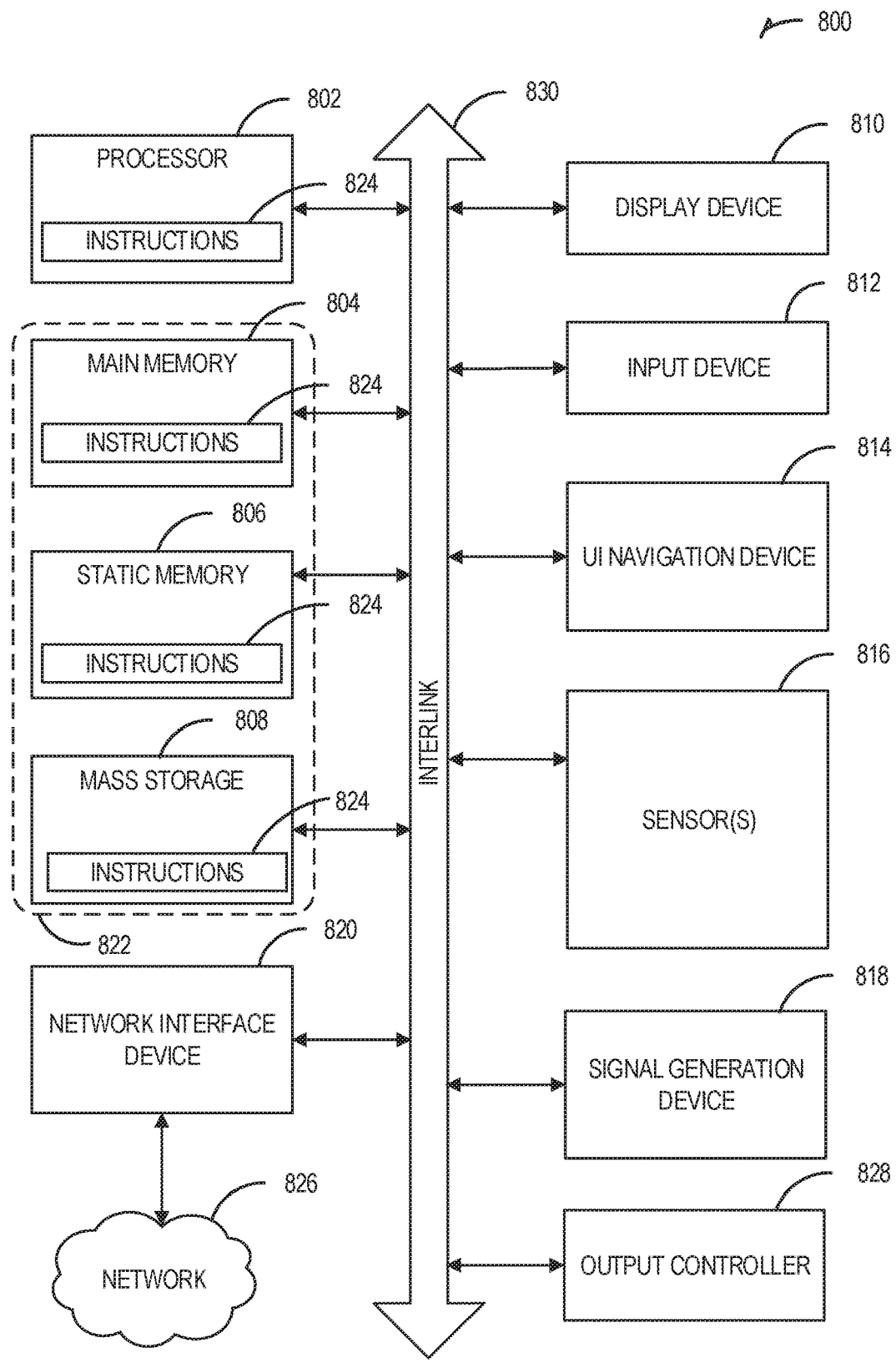
FIG. 8 is a block diagram illustrating an example of a machine upon which one or more embodiments may be implemented.

FIG. 8 illustrates a block diagram of an example machine 800 upon which any one or more of the techniques (e.g., methodologies) discussed herein may perform. Examples, as described herein, may include, or may operate by, logic or a number of components, or mechanisms in the machine 800. Circuitry (e.g., processing circuitry) is a collection of circuits implemented in tangible entities of the machine 800 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired).

In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 800 follow.

In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 800 may include a hardware processor 802 (e.g., a central processing unit (CPU), a graphics processing unit (GPU), a hardware processor core, or any combination thereof), a main memory 804, a static memory (e.g., memory or storage for firmware, microcode, a basic-input-output (BIOS), unified extensible firmware interface (UEFI), etc.) 806, and mass storage 808 (e.g., hard drive, tape drive, flash storage, or other block devices) some or all of which may communicate with each other via an interlink (e.g., bus) 830. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 808, a signal generation device 818 (e.g., a speaker), a network interface device 820, and one or more sensors 816, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 802, the main memory 804, the static memory 806, or the mass storage 808 may be, or include, a machine readable medium 822 on which is stored one or more sets of data structures or instructions 824 (e.g., software) embodying or utilized by any one or more of the techniques or functions described herein. The instructions 824 may also reside, completely or at least partially, within any of registers of the processor 802, the main memory 804, the static memory 806, or the mass storage 808 during execution thereof by the machine 800. In an example, one or any combination of the hardware processor 802, the main memory 804, the static memory 806, or the mass storage 808 may constitute the machine readable media 822. While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may be further transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMM), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software. A transmission medium is a machine readable medium.

ADDITIONAL NOTES & EXAMPLES

Example 1 is a system for device discovery, the system comprising processing circuitry to: initiate, by a gateway device, discovery in a self-organizing network attached to a first network interface of the gateway device, the gateway device including a second network interface attached to a network that has a discovery protocol different than that of the self-organizing network; receive a reply from a node in the self-organizing network in response to the discovery; extract a device class from the reply, the device class corresponding to the node and selected from a set of device classes defined for the network; register a mapping between the second network interface and the first network interface based on the device class; and respond to a query from the network using the mapping.

In Example 2, the subject matter of Example 1 optionally includes wherein the self-organizing network operates in accordance to an IEEE 802.15.4e family of standards.

In Example 3, the subject matter of any one or more of Examples 1-2 optionally include Routing Protocol for Low-Power and Lossy Networks (RPL).

In Example 4, the subject matter of Example 3 optionally includes wherein, to initiate, the processing circuitry transmits a Destination-Oriented Directed Acyclic Graph (DODAG) Information Object (DIO).

In Example 5, the subject matter of any one or more of Examples 3-4 optionally include wherein the reply is a Destination Advertisement Object (DAO).

In Example 6, the subject matter of Example 5 optionally includes wherein, to extract the device class from the reply, the processing circuitry extracts an encoding of the device class from a Target Descriptor Option of the DAO.

In Example 7, the subject matter of Example 6 optionally includes wherein the Target Descriptor Option is thirty-two bits.

In Example 8, the subject matter of any one or more of Examples 6-7 optionally include wherein the DAO includes the Target Descriptor Option, a Target Option, and a Transit Option.

In Example 9, the subject matter of any one or more of Examples 1-8 optionally include wherein, to extract the device class from the reply, the processing circuitry extracts a value from the reply, the value corresponding to the extracted device class.

In Example 10, the subject matter of Example 9 optionally includes wherein the device class is a sensor and wherein the value is a measurement from the sensor.

In Example 11, the subject matter of any one or more of Examples 9-10 optionally include wherein, to respond to the query from the network using the mapping, the processing circuitry is to: store the device class and the value to create a device-value cache; retrieve the device-value cache using the mapping; and respond to the query with the value.

In Example 12, the subject matter of Example 11 optionally includes wherein, to respond to the query with the value, the processing circuitry executes a request at a Uniform Resource Identifier (URI) when the value meets an acceptance criterion, the URI and the acceptance criterion included in the query.

In Example 13, the subject matter of any one or more of Examples 1-12 optionally include wherein, to respond to the query from the network using the mapping, the processing circuitry is to: retrieve a node identification corresponding to the device class, the node identification present in the reply; interrogate the node in the self-organizing network using the node identification, the interrogating specifying a result type; receive a result, in response to the interrogating, corresponding to the result type from the node; and respond to the query with the result.

Example 14 is a method for device discovery, the method comprising: initiating, by a gateway device, discovery in a self-organizing network attached to a first network interface of the gateway device, the gateway device including a second network interface attached to a network that has a discovery protocol different than that of the self-organizing network; receiving a reply from a node in the self-organizing network in response to the discovery; extracting a device class from the reply, the device class corresponding to the node and selected from a set of device classes defined for the network; registering a mapping between the second network interface and the first network interface based on the device class; and responding to a query from the network using the mapping.

In Example 15, the subject matter of Example 14 optionally includes wherein the self-organizing network operates in accordance to an IEEE 802.15.4e family of standards.

In Example 16, the subject matter of any one or more of Examples 14-15 optionally include Routing Protocol for Low-Power and bossy Networks (RPL).

In Example 17, the subject matter of Example 16 optionally includes wherein initiating the discovery includes transmitting a Destination-Oriented Directed Acyclic Graph (DODAG) information Object (DIO).

In Example 18, the subject matter of any one or more of Examples 16-17 optionally include wherein the reply is a Destination Advertisement Object (DAO).

In Example 19, the subject matter of Example 18 optionally includes wherein extracting the device class from the reply includes extracting an encoding of the device class from a Target Descriptor Option of the DAO.

In Example 20, the subject matter of Example 19 optionally includes wherein the Target Descriptor Option is thirty-two bits.

In Example 21, the subject matter of any one or more of Examples 19-20 optionally include wherein the DAO includes the Target Descriptor Option, a Target Option, and a Transit Option.

In Example 22, the subject matter of any one or more of Examples 14-21 optionally include wherein extracting the device class includes extracting a value from the reply, the value corresponding to the extracted device class.

In Example 23, the subject matter of Example 22 optionally includes wherein the device class is a sensor and wherein the value is a measurement from the sensor.

In Example 24, the subject matter of any one or more of Examples 22-23 optionally include wherein responding to the query from the network using the mapping includes: storing the device class and the value to create a device-value cache; retrieving the device-value cache using the mapping; and responding to the query with the value.

In Example 25, the subject matter of Example 24 optionally includes wherein responding to the query with the value includes executing a request at a Uniform Resource Identifier (URI) when the value meets an acceptance criterion, the URI and the acceptance criterion included in the query.

In Example 26, the subject matter of any one or more of Examples 14-25 optionally include wherein responding to the query from the network using the mapping includes: retrieving a node identification corresponding to the device class, the node identification present in the reply; interrogating the node in the self-organizing network using the node identification, the interrogating specifying a result type; receiving a result, in response to the interrogating, corresponding to the result type from the node; and responding to the query with the result.

Example 27 is a system comprising means to perform any method of Examples 14-26.

Example 28 is at least one machine readable medium including instructions that, when executed by processing circuitry, cause the processing circuitry to perform any method of Examples 14-26.

Example 29 is at least one machine readable medium including instructions for device discovery, the instructions, when executed by processing circuitry, cause the processing circuitry to perform operations comprising: initiating, by a gateway device, discovery in a self-organizing network attached to a first network interface of the gateway device, the gateway device including a second network interface attached to a network that has a discovery protocol different than that of the self-organizing network; receiving a reply from a node in the self-organizing network in response to the discovery; extracting a device class from the reply, the device class corresponding to the node and selected from a set of device classes defined for the network; registering a mapping between the second network interface and the first network interface based on the device class; and responding to a query from the network using the mapping.

In Example 30, the subject matter of Example 29 optionally includes wherein the self-organizing network operates in accordance to an IEEE 802.15.4e family of standards.

In Example 31, the subject matter of any one or more of Examples 29-30 optionally include Routing Protocol for Low-Power and Lossy Networks (RPL).

In Example 32, the subject matter of Example 31 optionally includes wherein initiating the discovery includes transmitting a Destination-Oriented Directed Acyclic Graph (DODAG) Information Object (DIO).

In Example 33, the subject matter of any one or more of Examples 31-32 optionally include wherein the reply is a Destination Advertisement Object (DAO).

In Example 34, the subject matter of Example 33 optionally includes wherein extracting the device class from the reply includes extracting an encoding of the device class from a Target Descriptor Option of the DAO.

In Example 35, the subject matter of Example 34 optionally includes wherein the Target Descriptor Option is thirty-two bits.

In Example 36, the subject matter of any one or more of Examples 34-35 optionally include wherein the DAO includes the Target Descriptor Option, a Target Option, and a Transit Option.

In Example 37, the subject matter of any one or more of Examples 29-36 optionally include wherein extracting the device class includes extracting a value from the reply, the value corresponding to the extracted device class.

In Example 38, the subject matter of Example 37 optionally includes wherein the device class is a sensor and wherein the value is a measurement from the sensor.

In Example 39, the subject matter of any one or more of Examples 37-38 optionally include wherein responding to the query from the network using the mapping includes: storing the device class and the value to create a device-value cache; retrieving the device-value cache using the mapping; and responding to the query with the value.

In Example 40, the subject matter of Example 39 optionally includes wherein responding to the query with the value includes executing a request at a Uniform Resource Identifier (URI) when the value meets an acceptance criterion, the URI and the acceptance criterion included in the query.

In Example 41, the subject matter of any one or more of Examples 29-40 optionally include wherein responding to the query from the network using the mapping includes: retrieving a node identification corresponding to the device class, the node identification present in the reply; interrogating the node in the self-organizing network using the node identification, the interrogating specifying a result type; receiving a result, in response to the interrogating, corresponding to the result type from the node; and responding to the query with the result.

Example 42 is a system for device discovery, the system comprising: means for initiating, by a gateway device, discovery in a self-organizing network attached to a first network interface of the gateway device, the gateway device including a second network interface attached to a network that has a discovery protocol different than that of the self-organizing network; means for receiving a reply from a node in the self-organizing network in response to the discovery; means for extracting a device class from the reply, the device class corresponding to the node and selected from a set of device classes defined for the network; means for registering a mapping between the second network interface and the first network interface based on the device class; and means for responding to a query from the network using the mapping.

In Example 43, the subject matter of Example 42 optionally includes wherein the self-organizing network operates in accordance to an IEEE 802.15.4e family of standards.

In Example 44, the subject matter of any one or more of Examples 42-43 optionally include Routing Protocol for Low-Power and Lossy Networks (RPL).

In Example 45, the subject matter of Example 44 optionally includes wherein the means for initiating the discovery include means for transmitting a Destination-Oriented Directed Acyclic Graph (DODAG) Information Object (DIO).

In Example 46, the subject matter of any one or more of Examples 44-45 optionally include wherein the reply is a Destination Advertisement Object (DAO).

In Example 47, the subject matter of Example 46 optionally includes wherein the means for extracting the device class from the reply include means for extracting an encoding of the device class from a Target Descriptor Option of the DAO.

In Example 48, the subject matter of Example 47 optionally includes wherein the Target Descriptor Option is thirty-two bits.

In Example 49, the subject matter of any one or more of Examples 47-48 optionally include wherein the DAO includes the Target Descriptor Option, a Target Option, and a Transit Option.

In Example 50, the subject matter of any one or more of Examples 42-49 optionally include wherein the means for extracting the device class include means for extracting a value from the reply, the value corresponding to the extracted device class.

In Example 51, the subject matter of Example 50 optionally includes wherein the device class is a sensor and wherein the value is a measurement from the sensor.

In Example 52, the subject matter of any one or more of Examples 50-51 optionally include wherein the means for responding to the query from the network using the mapping include: means for storing the device class and the value to create a device-value cache; means for retrieving the device-value cache using the mapping; and means for responding to the query with the value.

In Example 53, the subject matter of Example 52 optionally includes wherein the means for responding to the query with the value include means for executing a request at a Uniform Resource Identifier (URI) when the value meets an acceptance criterion, the URI and the acceptance criterion included in the query.

In Example 54, the subject matter of any one or more of Examples 42-53 optionally include wherein the means for responding to the query from the network using the mapping include: means for retrieving a node identification corresponding to the device class, the node identification present in the reply; means for interrogating the node in the self-organizing network using the node identification, the interrogating specifying a result type; means for receiving a result, in response to the interrogating, corresponding to the result type from the node; and means for responding to the query with the result.

Example 55 is at least one machine-readable medium including instructions, which when executed by a machine, cause the machine to perform operations of any of the operations of Examples 1-54.

Example 56 is an apparatus comprising means for performing any of the operations of Examples 1-54.

Example 57 is a system to perform the operations of any of the Examples 1-54.

Example 58 is a method to perform the operations of any of the Examples 1-54.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for device discovery, the system comprising processing circuitry to:
    initiate, by a gateway device, discovery in a self-organizing network attached to a first network interface of the gateway device, the gateway device including a second network interface attached to a network that has a discovery protocol different than that of the self-organizing network;
    receive a reply from a node in the self-organizing network in response to the discovery;
    extract a device class from the reply, the device class corresponding to the node and selected from a set of device classes defined for the network;
    register a mapping between the second network interface and the first network interface based on the device class; and
    respond to a query from the network using the mapping, wherein to respond to the query from the network using the mapping, the processing circuitry is to:
        retrieve a node identification corresponding to the device class, the node identification present in the reply;
        interrogate the node in the self-organizing network using the node identification, the interrogating specifying a result type;
        receive a result, in response to the interrogating, corresponding to the result type from the node; and
        respond to the query with the result.

2. The system of claim 1, wherein the self-organizing network operates in accordance with an IEEE 802.15.4e family of standards.

3. The system of claim 1, wherein the discovery operates in accordance with IPv6 Routing Protocol for Low-Power and Lossy Networks (RPL).

4. The system of claim 3, wherein, to initiate, the processing circuitry transmits a Destination-Oriented Directed Acyclic Graph (DODAG) Information Object (DIO).

5. The system of claim 3, wherein the reply is a Destination Advertisement Object (DAO).

6. The system of claim 5, wherein, to extract the device class from the reply, the processing circuitry extracts an encoding of the device class from a Target Descriptor Option of the DAO.

7. The system of claim 1, wherein, to extract the device class from the reply, the processing circuitry extracts a value from the reply, the value corresponding to the extracted device class.

8. The system of claim 7, wherein, to respond to the query from the network using the mapping, the processing circuitry is to:
store the device class and the value to create a device-value cache;
retrieve the device-value cache using the mapping; and
respond to the query with the value.

9. A method for device discovery, the method comprising:
initiating, by a gateway device, discovery in a self-organizing network attached to a first network interface of the gateway device, the gateway device including a second network interface attached to a network that has a discovery protocol different than that of the self-organizing network;
receiving a reply from a node in the self-organizing network in response to the discovery;
extracting a device class from the reply, the device class corresponding to the node and selected from a set of device classes defined for the network;
registering a mapping between the second network interface and the first network interface based on the device class; and
responding to a query from the network using the mapping, wherein responding to the query from the network using the mapping includes:
retrieving a node identification corresponding to the device class, the node identification present in the reply;
interrogating the node in the self-organizing network using the node identification, the interrogating specifying a result type;
receiving a result, in response to the interrogating, corresponding to the result type from the node; and
responding to the query with the result.

10. The method of claim 9, wherein the self-organizing network operates in accordance with an IEEE 802.15.4e family of standards.

11. The method of claim 9, wherein the discovery operates in accordance with IPv6 Routing Protocol for Low-Power and Lossy Networks (RPL).

12. The method of claim 11, wherein initiating the discovery includes transmitting a Destination-Oriented Directed Acyclic Graph (DODAG) Information Object (DIO).

13. The method of claim 11, wherein the reply is a Destination Advertisement Object (DAO).

14. The method of claim 13, wherein extracting the device class from the reply includes extracting an encoding of the device class from a Target Descriptor Option of the DAO.

15. The method of claim 9, wherein extracting the device class includes extracting a value from the reply, the value corresponding to the extracted device class.

16. The method of claim 15, wherein responding to the query from the network using the mapping includes:
storing the device class and the value to create a device-value cache;
retrieving the device-value cache using the mapping; and
responding to the query with the value.

17. At least one non-transitory machine readable medium including instructions for device discovery, the instructions, when executed by processing circuitry, cause the processing circuitry to perform operations comprising:
initiating, by a gateway device, discovery in a self-organizing network attached to a first network interface of the gateway device, the gateway device including a second network interface attached to a network that has a discovery protocol different than that of the self-organizing network;
receiving a reply from a node in the self-organizing network in response to the discovery;
extracting a device class from the reply, the device class corresponding to the node and selected from a set of device classes defined for the network;
registering a mapping between the second network interface and the first network interface based on the device class; and
responding to a query from the network using the mapping, wherein responding to the query from the network using the mapping includes:
retrieving a node identification corresponding to the device class, the node identification present in the reply;
interrogating the node in the self-organizing network using the node identification, the interrogating specifying a result type;
receiving a result, in response to the interrogating, corresponding to the result type from the node; and
responding to the query with the result.

18. The at least one non-transitory machine readable medium of claim 17, wherein the self-organizing network operates in accordance with an IEEE 802.15.4e family of standards.

19. The at least one non-transitory machine readable medium of claim 17, wherein the discovery operates in accordance with IPv6 Routing Protocol for Low-Power and Lossy Networks (RPL).

20. The at least one non-transitory machine readable medium of claim 19, wherein initiating the discovery includes transmitting a Destination-Oriented Directed Acyclic Graph (DODAG) Information Object (DIO).

21. The at least one non-transitory machine readable medium of claim 19, wherein the reply is a Destination Advertisement Object (DAO).

22. The at least one non-transitory machine readable medium of claim 21, wherein extracting the device class from the reply includes extracting an encoding of the device class from a Target Descriptor Option of the DAO.

23. The at least one non-transitory machine readable medium of claim 17, wherein extracting the device class includes extracting a value from the reply, the value corresponding to the extracted device class.

24. The at least one non-transitory machine readable medium of claim 23, wherein responding to the query from the network using the mapping includes:
storing the device class and the value to create a device-value cache;
retrieving the device-value cache using the mapping; and
responding to the query with the value.

* * * * *